US012504728B2

(12) United States Patent
Lyman

(10) Patent No.: US 12,504,728 B2
(45) Date of Patent: *Dec. 23, 2025

(54) MANAGING BARRIER AND OCCUPANCY BASED HOME AUTOMATION SYSTEM

(71) Applicant: Vivint, Inc., Provo, UT (US)

(72) Inventor: Jefferson Lyman, Alpine, UT (US)

(73) Assignee: Vivint LLC, Provo, UT (US)

(*) Notice: Subject to any disclaimer, the term of this patent is extended or adjusted under 35 U.S.C. 154(b) by 0 days.

This patent is subject to a terminal disclaimer.

(21) Appl. No.: 16/397,210

(22) Filed: Apr. 29, 2019

(65) Prior Publication Data
US 2019/0317462 A1 Oct. 17, 2019

Related U.S. Application Data

(63) Continuation of application No. 14/262,506, filed on Apr. 25, 2014, now Pat. No. 10,274,909.

(51) Int. Cl.
G05B 15/02 (2006.01)
H04L 12/28 (2006.01)

(52) U.S. Cl.
CPC .......... *G05B 15/02* (2013.01); *H04L 12/2803* (2013.01); *H04L 12/2827* (2013.01)

(58) Field of Classification Search
CPC .. G05B 15/02; H04L 12/2803; H04L 12/2877
See application file for complete search history.

(56) References Cited

U.S. PATENT DOCUMENTS

| 3,790,944 A * | 2/1974 | Yarwood ............... G08B 13/08 340/545.9 |
| 4,303,851 A | 12/1981 | Mottier |
| 5,926,518 A | 7/1999 | Asokawa |
| 6,480,804 B2 | 11/2002 | Maeda et al. |

(Continued)

FOREIGN PATENT DOCUMENTS

| DE | 102013103535 A1 * | 10/2014 | ............ G08B 13/08 |
| JP | 2007262695 A | 10/2007 | |

(Continued)

OTHER PUBLICATIONS

"Fingertec faceid," FingerTech, Mar. 31, 2011, http://www.fingertec.com/images/w_brochure/FaceID3_e.html.

(Continued)

*Primary Examiner* — Wissam Rashid
(74) *Attorney, Agent, or Firm* — Nolte Lackenbach Siegel; N. Alexander Nolte

(57) ABSTRACT

Methods and systems are described for controlling access to a home based on user occupancy. According to at least one embodiment, an apparatus for controlling access to a home based on user occupancy includes a processor, a memory in electronic communication with the processor, and instructions stored in the memory which are executable by a processor to determine a location of a user of a home automation system relative to a barrier of a home being monitored by the home automation system. The instructions are executable to determine whether to permit a change in a locking mechanism of the barrier based in part on the determined location of the user, and maintain a current state of the home automation system.

18 Claims, 9 Drawing Sheets

(56) References Cited

U.S. PATENT DOCUMENTS

| | | | |
|---|---|---|---|
| 6,720,874 B2 | 4/2004 | Fufidio et al. | |
| 6,867,683 B2 | 3/2005 | Calvesio et al. | |
| 7,131,132 B1 | 10/2006 | Gehlot et al. | |
| 7,366,329 B2 | 4/2008 | Ono | |
| 7,688,349 B2 | 3/2010 | Flickner et al. | |
| 7,787,656 B2 | 8/2010 | Chen | |
| 7,971,156 B2 | 6/2011 | Albertson et al. | |
| 8,339,271 B2 | 12/2012 | Tabib | |
| 8,542,879 B1 | 9/2013 | Nechyba et al. | |
| 8,750,576 B2 | 6/2014 | Huang et al. | |
| 8,780,201 B1 | 7/2014 | Scalisi et al. | |
| 8,988,350 B2 | 3/2015 | Karmarkar et al. | |
| 9,001,199 B2 | 4/2015 | Sinha et al. | |
| 9,014,546 B2 | 4/2015 | Shimy et al. | |
| 9,057,210 B2 | 6/2015 | Dumas et al. | |
| 9,269,012 B2 | 2/2016 | Fotland | |
| 9,317,985 B2 | 4/2016 | Tehranchi et al. | |
| 9,443,365 B2* | 9/2016 | Ahearn | G07C 9/28 |
| 9,573,541 B2 | 2/2017 | Graumann et al. | |
| 9,596,084 B2 | 3/2017 | Papakipos et al. | |
| 9,607,225 B2 | 3/2017 | Ick | |
| 9,721,383 B1 | 8/2017 | Horowitz et al. | |
| 9,781,339 B2 | 10/2017 | Lim et al. | |
| 9,866,820 B1 | 1/2018 | Agrawal et al. | |
| 9,911,361 B2 | 3/2018 | Wexler et al. | |
| 10,127,754 B2 | 11/2018 | Child et al. | |
| 10,235,822 B2 | 3/2019 | Nye | |
| 10,274,909 B2 | 4/2019 | Lyman | |
| 2004/0151347 A1 | 8/2004 | Wisniewski | |
| 2004/0153671 A1 | 8/2004 | Schuyler et al. | |
| 2006/0176146 A1 | 8/2006 | Krishan et al. | |
| 2006/0243799 A1 | 11/2006 | Kelly et al. | |
| 2007/0183634 A1 | 8/2007 | Dussich et al. | |
| 2007/0290793 A1 | 12/2007 | Tran | |
| 2008/0285802 A1 | 11/2008 | Bramblet et al. | |
| 2009/0051528 A1 | 2/2009 | Graichen | |
| 2010/0097225 A1 | 4/2010 | Petricoin, Jr. | |
| 2010/0283579 A1 | 11/2010 | Kraus et al. | |
| 2010/0289644 A1 | 11/2010 | Slavin et al. | |
| 2011/0069940 A1 | 3/2011 | Shimy et al. | |
| 2011/0091080 A1 | 4/2011 | Gamliel et al. | |
| 2011/0263946 A1 | 10/2011 | el Kaliouby et al. | |
| 2012/0088581 A1 | 4/2012 | Mao et al. | |
| 2012/0154115 A1* | 6/2012 | Herrala | G07C 9/27 340/5.64 |
| 2012/0169453 A1* | 7/2012 | Bryla | E05B 47/00 340/3.1 |
| 2012/0280783 A1 | 11/2012 | Gerhardt et al. | |
| 2012/0326868 A1 | 12/2012 | Goel | |
| 2013/0237193 A1* | 9/2013 | Dumas | G07C 9/00571 455/414.1 |
| 2014/0049361 A1 | 2/2014 | Ahearn et al. | |
| 2014/0049369 A1 | 2/2014 | Ahearn et al. | |
| 2014/0226861 A1 | 8/2014 | Zhang et al. | |
| 2014/0266669 A1* | 9/2014 | Fadell | H04W 4/80 340/501 |
| 2015/0309487 A1 | 10/2015 | Lyman | |
| 2015/0363986 A1 | 12/2015 | Hoyos et al. | |

FOREIGN PATENT DOCUMENTS

| | | |
|---|---|---|
| KR | 20060083557 A | 7/2006 |
| KR | 1020160006554 A | 1/2016 |
| WO | 0208022 A2 | 1/2002 |

OTHER PUBLICATIONS

International Search Report and Written Opinion of the International Searching Authority for PCT/US2015/026921, Jul. 21, 2015.
PCT International Search Report for International Application No. PCT/US2017/026135, mailed May 31, 2017 (3 pp.).
Supplementary European Search Report for EP Application No. 15782833, mailed Sep. 13, 2017 (2 pp.).

* cited by examiner

MANAGING BARRIER AND OCCUPANCY BASED HOME AUTOMATION SYSTEM

CROSS-REFERENCE TO RELATED APPLICATION

The present application is a continuation of U.S. patent application Ser. No. 14/262,506, filed Apr. 25, 2014, titled "MANAGING BARRIER AND OCCUPANCY BASED HOME AUTOMATION SYSTEM" and assigned to the assignee hereof, the disclosure of which is incorporated herein in its entirety by this reference.

BACKGROUND

Advancements in media delivery systems and media-related technologies continue to increase at a rapid pace. Increasing demand for media has influenced the advances made to media-related technologies. Computer systems have increasingly become an integral part of the media-related technologies. Computer systems may be used to carry out several media-related functions. The wide-spread access to media has been accelerated by the increased use of computer networks, including the Internet and cloud networking.

Many homes and businesses use one or more computer networks to generate, deliver, and receive data and information between the various computers connected to computer networks. Users of computer technologies continue to demand increased access to information and an increase in the efficiency of these technologies. Improving the efficiency of computer technologies is desirable to those who use and rely on computers.

With the wide-spread use of computers and mobile devices has come an increased presence of home automation and security products. Advancements in mobile devices allow users to monitor and/or control an aspect of a home or business. As home automation and security products expand to encompass other systems and functionality in the home, opportunities exist for simplifying the user's interface with the home automation and security system and providing improved automated control.

SUMMARY

Methods and systems are described for controlling access to a home based on user occupancy. According to at least one embodiment, an apparatus for controlling access to a home based on user occupancy includes a processor, a memory in electronic communication with the processor, and instructions stored in the memory which are executable by a processor to determine a location of a user of a home automation system relative to a barrier of a home being monitored by the home automation system. The instructions are executable to determine whether to permit a change in a locking mechanism of the barrier based in part on the determined location of the user, and maintain a current state of the home automation system.

In one example, the instructions may be executable by the processor to determine an identity of the user, wherein determining whether to permit the change in the locking mechanism of the barrier is based in part on the identity of the user. The state of the home automation system may be an active or armed state. Determining a location of the user may include determining whether the user is inside or outside of the home. Determining a location of the user may include determining on which side of the barrier the user is positioned. The barrier may be one of a door or a window of the home, and the change in the locking mechanism may include locking or unlocking the locking mechanism to control opening of the door or window. Determining the location of the user may include determining whether the user is touching an inside handle used to control opening the barrier or an outside handle used to control opening of the barrier. Determining whether to permit a change in the locking mechanism of the barrier may include unlocking the locking mechanism if the user is inside the house. Determining whether to permit a change in the locking mechanism of the barrier may include unlocking the locking mechanism if the user is located inside or outside the home and is identified as an authorized person, and maintaining the barrier locked if the user is located inside or outside the home and is identified as an unauthorized person. The instructions may be executable by the processor to generate an alarm when the user is identified as an unauthorized person and attempts to open the barrier from outside of the home. Determining a location of a user may include receiving signals from at least one of a touch sensor, a voice recognition sensor, a motion sensor, and an optical sensor.

Another embodiment relates to a computer-program product for controlling access to a home based on user occupancy. The computer-program product may include a non-transitory computer-readable medium storing instructions executable by a processor to determine a location of a user of a home automation system relative to a barrier of a home being monitored by the home automation system. The instructions are executable to determine an identity of the user, determine whether to permit a change in a locking mechanism of the barrier based in part on the determined location of the user and the identity of the user, and maintain a current state of the home automation system.

In one example, maintaining a current state may include maintaining the home automation system in a constant active state. Determining whether to permit a change in the locking mechanism of the barrier may include unlocking the locking mechanism if the user is located inside or outside the home and is identified as an authorized person, and maintaining the barrier locked if the user is located outside the home and is identified as an unauthorized person. Determining a location of the user may include determining if the user is touching an inside handle or an outside handle used to open the barrier. Determining an identity of the user may include receiving a signal from an electronic device carried by the user.

A further embodiment is directed to a computer-implemented method for controlling access to a home based on user occupancy. The method includes determining a location of a user of a home automation system relative to a barrier of a home being monitored by the home automation system, determining an identity of the user, determining whether to permit opening the barrier based in part on the determined location and identity of the user, and maintaining an active state of the home automation system.

In one example, the method further includes unlocking a locking mechanism of the barrier when the user is identified as an authorized user, and locking the locking mechanism when the user is identified as an unauthorized user. The method may include unlocking a locking mechanism of the barrier when the user is determined to be located on one side of the barrier, and locking the locking mechanism when the user is determined to be located on an opposite side of the barrier. Determining a location of the user may include determining use of a handle assembly used to open the barrier.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the spirit and scope of the appended claims. Features which are believed to be characteristic of the concepts disclosed herein, both as to their organization and method of operation, together with associated advantages will be better understood from the following description when considered in connection with the accompanying figures. Each of the figures is provided for the purpose of illustration and description only, and not as a definition of the limits of the claims.

BRIEF DESCRIPTION OF THE DRAWINGS

A further understanding of the nature and advantages of the embodiments may be realized by reference to the following drawings. In the appended figures, similar components or features may have the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label.

Figure 1:
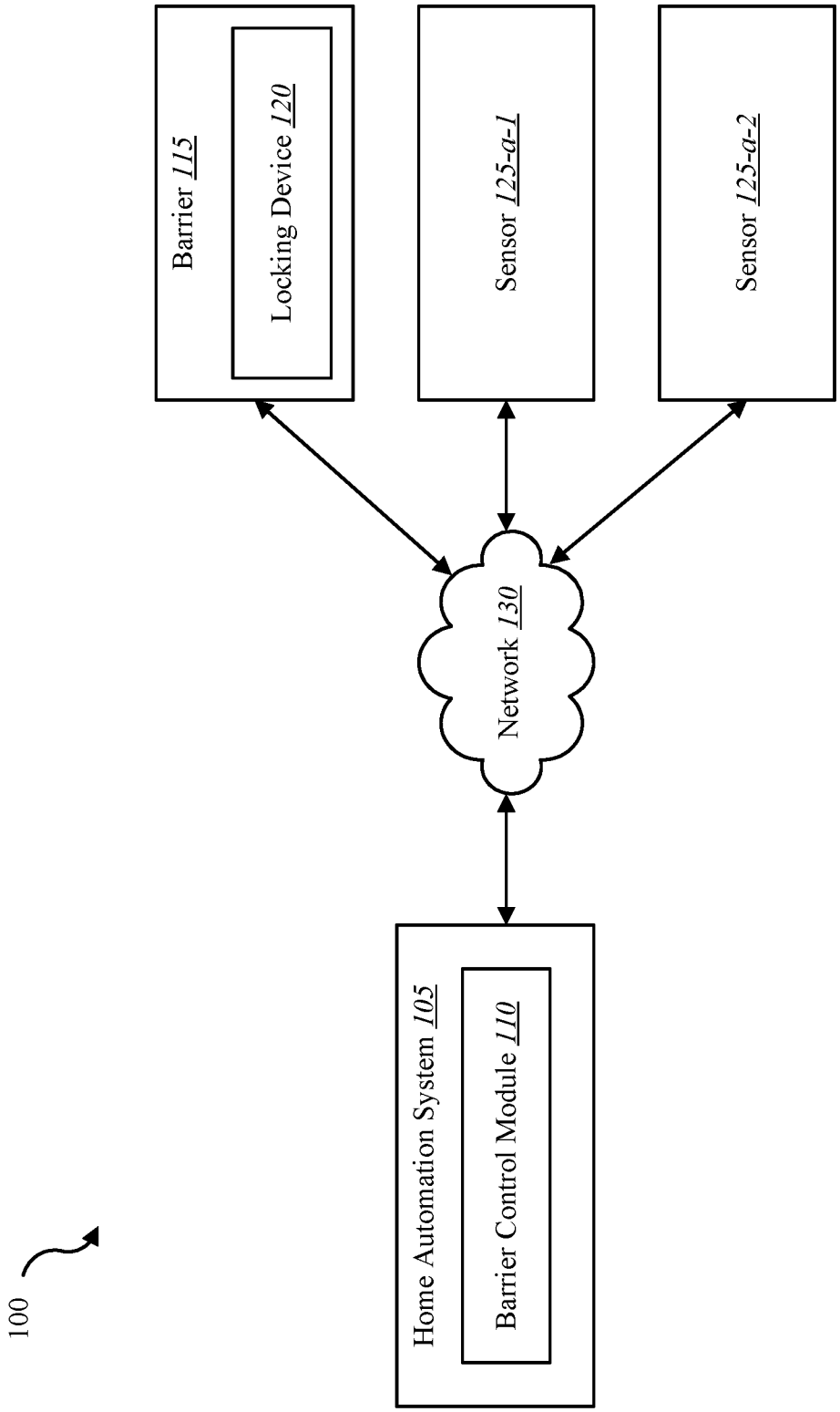
FIG. 1 is a block diagram of an environment in which the present systems and methods may be implemented.

While the embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the instant disclosure covers all modifications, equivalents, and alternatives falling within the scope of the appended claims.

DETAILED DESCRIPTION

The systems and methods described herein relate to home automation and home security, and related security systems and automation for use in commercial and business settings. More specifically, the systems and methods described herein relate to controlling access to a home or business based at least in part on user occupancy (e.g., whether the user is inside or outside of the home), user identity, and user activities. The term "home" used throughout this document generically refers to any dwelling or property that is monitored by a monitoring system such as an automation system and/or a security system. An automation system may include automation and security features.

One aspect of the present disclosure relates to a home automation and/or home security system that is always in a "on," "active" or "armed" state. The system determines via a combination of identifiers whom is in the home and activities of those in the home, as well as distinguish between who is trying to gain access to the home, and whether or not to trigger an alarm when barriers to the home (e.g., doors or windows) are actuated. The system includes sufficient sensor feedback and intelligence to determine who is authorized to gain access to one of the home barriers and who is not, and then trigger an alarm only when unauthorized persons gain access to the home. Those who are authorized to enter the home typically possess or are identified using, for example, a key code, a near field communication like Bluetooth, a voice recognition or image recognition, or the like that the system is able to utilize as part of determining identity of a person. In contrast, those who do not have authorization would trigger firing of the alarm if attempting to gain access to the home. The authorized operators of the home automation and/or home security system (generally referred to as a home automation system or a monitoring system) are no longer required to arm or disarm the system (e.g., turn on or turn off).

One way to determine whether accessing a barrier of the home is authorized is to distinguish between accessing the barrier from inside the house or from outside the house. Various sensors, door and window lock features, GPS readings, near field communication signals, and the like may be used to determine the user's position relative to the barrier as well as the user's intent to open the barrier. Another aspect of the present disclosure relates to using a multi-step verification process to confirm not only the user's location relative to a barrier of the home, but also the user's intent and the user's identity.

A further aspect of the present disclosure is directed to devices and related systems to track individuals relative to a home or other predetermined location. In one example, a device may include at least a GPS feature and a near field communication feature (e.g., Bluetooth) which provide location for the carrier of the device as well as provide identification information that may provide authorization for the person carrying the device to access the home. The device may also include an accelerometer which may provide feedback related to activity level of the user. This type of device and related system may be particularly useful for tracking children, elderly and handicapped persons, and pets. The device may be integrated into clothing, accessories (e.g., watches, necklaces, bracelets), or a dedicated electronic device such as a fob that may be held in a pocket or carried on a key chain. Aspects of the device may also be integrated into an existing, multi-functional electronic device such as a cell phone, a tablet computer, or the like. The electronic device may also include a speaker that provides audible signals for communication with the user. The device may be referred to as a tracking device.

FIG. 1 is a block diagram illustrating one embodiment of an environment 100 in which the present systems and methods may be implemented. In some embodiments, the systems and methods described herein may be performed on a home automation system 105. The home automation system 105 may include automation and/or security features and functionality. The home automation system 105 may be generally referred to as the monitoring system, or certain aspects of home automation system 105 may be referred to as a monitoring system, automation system, and/or security system. The home automation system 105 may be useful for applications in a home. Alternatively, or additionally, home automation system 105 may be applicable to a place of business and/or commercial setting. The same principles disclosed herein related to home automation system 105 and environment 100 generally, may be applied in many settings including homes and commercial buildings (e.g., warehouses, office buildings, etc.).

The environment 100 may include the home automation system 105, a barrier 115, and first and second sensors 125-a-1 and 125-a-2, which communicate over at least one network 130. Home automation system 105 may include a barrier control module 110. Barrier 115 may include a locking device 120. Sensors 125-a-1 and 125-a-2 may be any of a variety of sensors or other data collection devices used to determine occupancy, activity, identification, and/or specific location of one or more persons for purposes of, for example, controlling access to a home and/or determining location of one or more persons relative to a home. The network 130 provides communication via, for example, wired or wireless connections. Further, network 130 may include a plurality of communication mediums.

The sensors 125-a-1 and 125-a-2 may be associated with, for example, an automation system and/or a security system. The sensors 125-a-1 and 125-a-2 may include, for example, a camera sensor, an audio sensors, a forced-entry sensor, a shock sensor, a proximity sensor, a boundary sensor, an appliance sensor, a light fixture sensor, a temperature sensor, a light beam sensor, a three dimensional (3D) sensor, a motion sensor, a smoke sensor, a glass break sensor, a door sensor, a window sensor, a carbon monoxide sensor, an accelerometer, a global positioning system (GPS) sensor, a Wi-Fi positioning system sensor, a capacity sensor, a radio frequency sensor, a near-field communication sensor (Bluetooth), a heart beat sensor, a breathing sensor, an oxygen sensor, a carbon dioxide sensor, a brainwave sensor, a movement sensor, a voice sensor, and the like.

Figure 4:
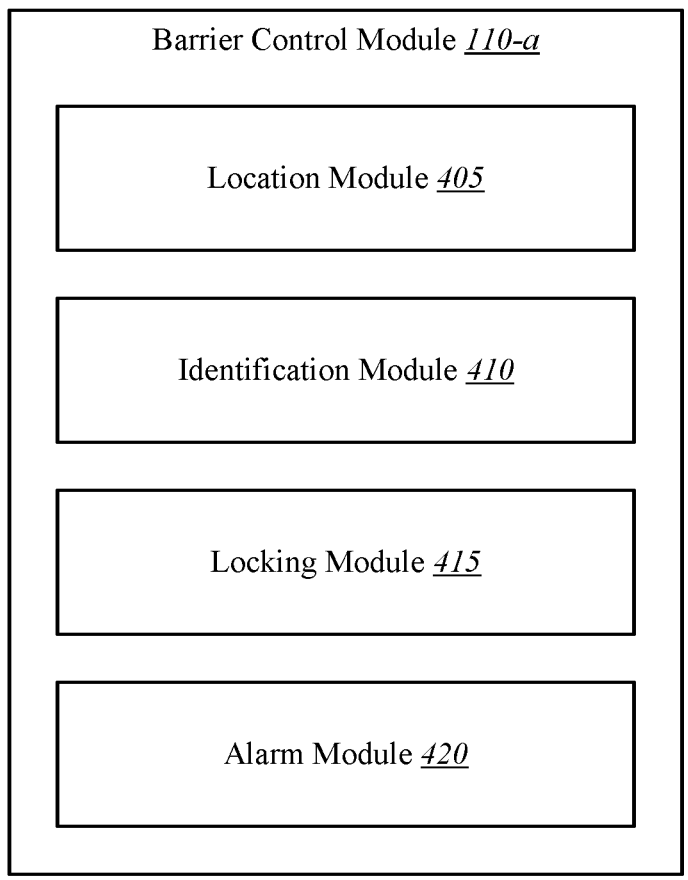
FIG. 4 is a block diagram of an example barrier control module of the environments shown in FIGS. 1 and 2.

In some configurations, home automation system 105 may include additional components such as, for example, those components described below with reference to FIG. 2. Barrier control module 110, which is described in further detail below related to FIG. 4, is operable to provide communications and controls related to accessing barriers such as doors and windows of a building (e.g., home or a commercial building). Barrier control module 110 may include different types of functionality including, for example, receiving data from locking device 120, sensors 125-a-1 and 125-a-2 and other features of environment 100, determining a location of one or more persons relative to the home, determining an intended action of the person (e.g., opening or closing a door or window), and determining whether to permit the intended action and/or trigger an alarm if the action is not authorized or is performed by an unauthorized person. Trigger an alarm may include sending a notice to, for example, police, security personnel, an owner or person responsible for the home, or a person attempting to perform the action (e.g., operate barrier 115).

A locking device 120 may operate to control opening of barrier 115. Locking device 120 may include capability to determine whether barrier 115 is being accessed from inside or outside the home. For example, a locking device 120 may have integrated therein at least one of sensors 125-a-1 and 125-a-2, which utilize a technology such as, for example, touch sensors, electromagnetic sensors, motion sensors, optical sensors, or the like. Data received from locking device 120 and/or sensors 125-a-1 and 125-a-2 may be used to help determine on which side of the barrier the operator is positioned and/or which components of locking device 120 are being actuated (e.g., a handle or switch positioned on and outside or inside of the barrier 115).

As discussed above, home automation system 105 and/or environment 100 generally may be operable in an always "on" (e.g., active or armed) operational state. Home automation system 105 may be a "smart" system that is able to determine, based on information gathered from a variety of sources such as sensors 125-a-1 and 125-a-2 and other features of environment 100, which individuals located in and around a home are authorized to access the home and/or perform certain functions/activities. By maintaining the home automation system 105 in an always "on" state, authorized users are able to avoid the arduous task of having to arm and disarm the system (whether onsite or remotely) to provide the desired automation and/or security functionality for the home.

In one scenario, home automation system 105 operates to permit anyone who is within the home to exit the home while the home automation system 105 remains in an "on" state without triggering an alarm. The system presumes that any person who is located within the house has been authorized in some way to enter the house, and is therefore authorized to exit the house at any time. Thus, the user's location (e.g., occupancy) within the home may alone be enough to provide authorization for the user to exit the home without triggering an alarm event. Similarly, users positioned within the house may operate windows or other barriers without triggering an alarm as long as the users are within the house. The home automation system 105 may be programmed to automatically operate locking device 120 to unlock barrier 115 as a user approaches barrier 115 and/or attempts to open barrier 115 (e.g., to exit). Additionally, or alternatively, home automation system 105 may be programmed to permit only certain authorized users to operate barrier 115 when the user is within the home. In some situations, elderly persons, handicapped persons, or small children may be prohibited from exiting the home or operating barrier 115 without express permission of authorized users. In such scenarios, those persons residing within the home may have an identifier that provides home automation system 105 with an identification factor used to determine whether that user is authorized to access barrier 115. In one example, authorized users may be identified using, for example, a cell phone app, near field communication such as Bluetooth, voice recognition, facial recognition, fingerprint recognition, or the like. Once home automation system 105 confirms whether the user is authorized via one of these identification methods, home automation system 105 permits the user to access barrier 115 from within the home (e.g., without triggering an alarm).

A similar principle may apply to provide authentication of users who are positioned outside of the house. Once a user is identified as an authorized user, home automation system 105 may permit the user to access barrier 115 regardless of the location of the user inside or outside the house. As such, home automation system 105 may remain in an armed state while an authorized user operates barrier 115 from inside or outside the house without triggering an alarm.

In at least some scenarios, an additional authentication factor may be required before permitting access to a barrier. For example, home automation system 105 may receive confirmation that the user is an authorized user and require further information that shows the user's intent to access barrier 115. Home automation system 105 may automatically unlock locking device 120 or otherwise permit operation of barrier 115 after both the authentication and intent factors are satisfied. In one example, a user carries a cell phone that has an app that communicates with home automation system 105 to confirm that the user carrying the cell phone is authorized. The user must also touch the door handle or other feature of barrier 115 in order to show the user's intent to access barrier 115 before home automation system 105 performs a function such as, for example, unlocking the locking device 120 or otherwise permitting operation of barrier 115 without triggering an alarm. Similarly, home automation system 105 may generate an alarm or prohibit operation of barrier 115 if the user shows his intent to operate barrier 115 and home automation system 105 determines that the user is not authorized to operate barrier 115 (e.g., in the case of a small child, handicapped person, etc.).

Locking device 120 may be controlled automatically by home automation system 105 based on criteria such as, for example, whether the user is an authorized user, the location of the user relative to barrier 115 (e.g., on inside or outside of barrier 115), the intent of the user (e.g., operating a lock or handle of barrier 115), time of day, a preprogrammed event or rule, etc. The automated control of locking device 120 may permit users to enter and exit the home without the need of a key or other means of manually operating locking device 120. As such, the system may be referred to as a keyless system and/or a keyless home wherein access is automatically granted based on predetermined criteria.

Authorized users may obtain entry of unauthorized users in a number of ways. For example, unauthorized users may be given a fab or other electronic device that communicates with home automation system 105 to permit access through a barrier of the house. In another example, operation of a barrier by an authorized user, whether from inside or outside the house, to permit entry or exit by an unauthorized person avoids the unauthorized person triggering an alarm.

Figure 2:
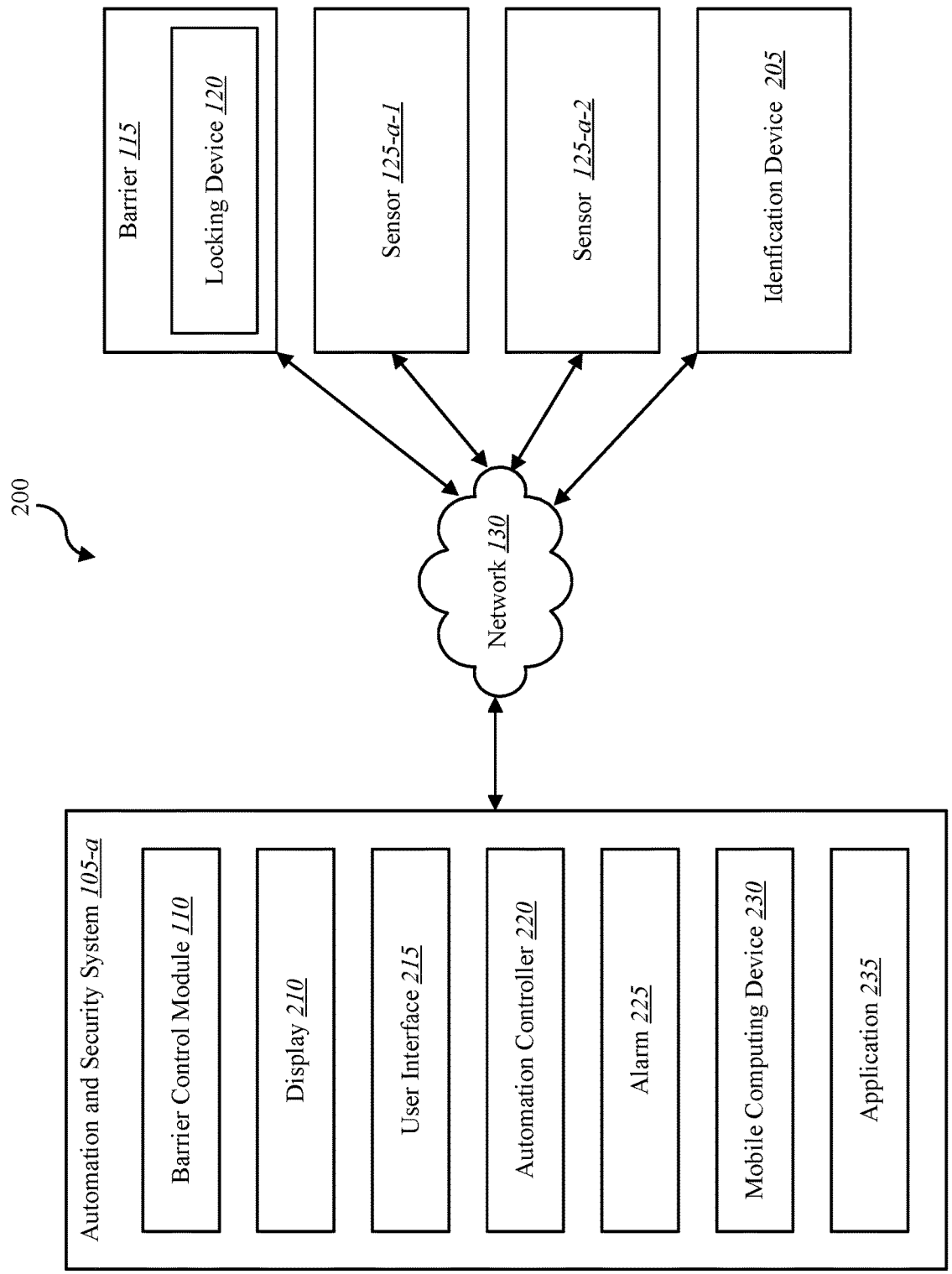
FIG. 2 is a block diagram of another environment in which the present systems and methods may be implemented.

Referring now to FIG. 2, in some embodiments, an environment 200 may include the components of environment 100 described above, and may further include an identification device 205 and a number of additional features associated with home automation system 105-a. Home automation system 105-a may be an example of home automation system 105 illustrated in FIG. 1. Home automation system 105-a may include, for example, the barrier control module 110, a display 210, a user interface 215, an automation controller 220, an alarm 225, a mobile computing device 230, and an application 235.

Environment 200 addresses at least one of the scenarios discussed above with reference to environment 100 in which the user carries identification device 205 which communicates with home automation system 105-a determine whether the user is a authorized user. If the user is fully authorized (e.g., a highest level of authorization), the user may access barrier 115 from either inside or outside the home without triggering an alarm. If the user is identified by identification device 205 to have a lower level of authorization, the user may have only certain rights such as, for example, operating barrier 115 from the outside to gain access into the home, while not being authorized to access barrier 115 from inside the house to prevent exiting the home. If a user does not carry identification device 205 is determined to be an unauthorized user, the user may be permitted to exit the home through barrier 115 from the inside (i.e., the system assumes that anyone inside the home was granted access by an authorized user) but to not operate barrier 115 from outside of the home without triggering an alarm.

Identification device 205 may include, for example, a cell phone, fob, or other electronic device that signals sufficient information to determine whether the person carrying identification device 205 is authorized or has a certain level of authorization. In one example, identification device 205 includes near-field communication capability that generates a beacon or other signal that either identifies the person carrying identification device 205 as an authorized person, or provides sufficient information that is unique to that person to determine whether they are authorized or possess some level of authorization for certain actions. Identification device 205 may include, for example, an app carried by a cell phone, tablet or other computing device that provides communication with sensors 125-a-1 and 125-a-2 or other sensors or features of environment 200. Barrier control module 110 may collect information and/or signals from sensors 125-a-1 and 125-a-2 and identification device 205 and determine whether to operate locking device 120 or otherwise permit operation of barrier 115 and/or generate an alarm.

Display 210 may be provided via devices such as, for example, a desk top computer, a mobile computing device, or identification device 205. User interface 215 may be integrated into display 210. User interface 215 may include a plurality of menus, screens, microphones, speakers, cameras, and other capabilities that provide an interface with the user of home automation system 105-a. User interface 215 may be integrated into mobile computing device 230 or other devices (e.g., one of locking device 120 and/or sensors 125-a-1 and 125-a-2).

Automation controller 220 may provide features or functionality related to automation and/or security features of home automation system 105-a. Automation controller 220 may provide at least some of the logic, processing and/or functionality for various components of home automation system 105-a.

Alarm 225 may provide, for example, audible sounds, lights, or the like that communicate with one or more users on the premises being monitored by home automation system 105-a, or communicate with a remote device or system related to a condition of the property being monitored by home automation system 105-a. Alarm 225 may be integrated into display 210 in the form of, for example, text, coded displays, or the like.

In some embodiments, mobile computing device 230 may include one or more processors, one or more memory devices, and/or a storage device. Examples of mobile computing device 230 may include DVRs, personal video recorders (PVRs), and/or mobile computing devices, smart phones, personal computing devices, computers, servers, etc. Mobile computing device 230 may include, for example, features or functionality of identification device 205, and may, in at least some examples, be interchangeable with identification device 205.

Application 235 may allow a user to control (either directly or via automation controller 220) an aspect of the monitored property, including, for example, security, energy management, locking or unlocking a door (e.g., barrier 115 via locking device 120), checking the status of a door, locating a user or item, controlling lighting, thermostats or cameras, receiving notifications regarding a current status or anomaly associated with a home, office, place of business and the like. In some configurations, application 235 may enable home automation system 105-a to interface with automation controller 220 and utilize user interface 215 to display automation, security and/or energy management content on display 210, user interface 215, mobile computing device 230 or other features of home automation system 105-a. Thus, application 235, via, for example, user interface 215 may allow users to control aspects of their home, office, and/or other type of property. Further, application 235 may be installed on mobile computing device 230 in order to allow the user to interface with a function of home automation system 105-a (e.g., automation controller 220).

Sensors 125-a-1 and 125-a-2 shown and described with reference to FIGS. 1 and 2 may represent one or more separate sensors or a combination of two or more sensors in a single device. For example, sensors 125-a-1 and 125-a-2 may represent one or more camera sensors and one or more motion sensors connected to environment 200. Additionally, or alternatively, sensors 125-a-1 and 125-a-2 may represent a combination of sensors such as both a camera sensor and a motion sensor integrated into the same sensor device. Although sensors 125-a-1 and 125-a-2 are depicted as connected to home automation system 105-a separately via network 130, in some embodiments one or more of sensors 125-a-1 and 125-a-2 may be connected directly to home automation system 105-a, barrier 115 (e.g., via locking device 120), or identification device 205. Additionally, or alternatively, sensors 125-a-1 and 125-a-2 may be integrated into a home appliance or fixture such as a light bulb fixture. Sensors 125-a-1 and 125-a-2 may include a wireless communication device, which enables sensors 125-a-1 and 125-a-2 to send and receive data and/or information to and from one or more devices in environment 200. Additionally, or alternatively, sensors 125-a-1 and 125-a-2 may include a GPS sensor to enable sensors 125-a-1 and 125-a-2 to track the location of a sensor. Sensors 125-a-1 and 125-a-2 may include a proximity sensor to enable the sensor to detect proximity of a user relative to a predetermined distance from a dwelling (e.g., geo fencing). Sensors 125-a-1 and 125-a-2 may include one or more security detection sensors such as, for example, a glass break sensor, a motion detection sensor, or both. Additionally, or alternatively, sensors 125-a-1 and 125-a-2 may include a smoke detection sensor, a carbon monoxide sensor, or both. In at least one example, sensors 125-a-1 and 125-a-2 may detect the presence of a user within a dwelling being monitored by a home automation system 105-a, a user performing certain functions (e.g., opening or closing a door or window via, for example, a locking device 120), or a user speaking a voice command. Feedback from sensors 125-a-1 and 125-a-2 may function as at least one authentication factor used by barrier control module 110 to determine whether a user is authorized to access one or more barriers 115.

In some embodiments, a user may access the functions of home automation system 105-a (e.g., automation controller 220) from a remote location via, for example, mobile computing device 230. For example, in some embodiments, a mobile computing device 230 includes a mobile application that interfaces with one or more functions of home automation system 105-a (e.g., locking device 120). Locking device 120 and identification device 205 may be one example of mobile computing device 230. Examples of automation controller 220 may include a dedicated home automation computing device (e.g., a wall-mounted controller), a personal computing device (e.g., laptop, desktop, etc.), a mobile computing device (e.g., tablet computing device, smart phone, etc.), and the like.

Figure 3:
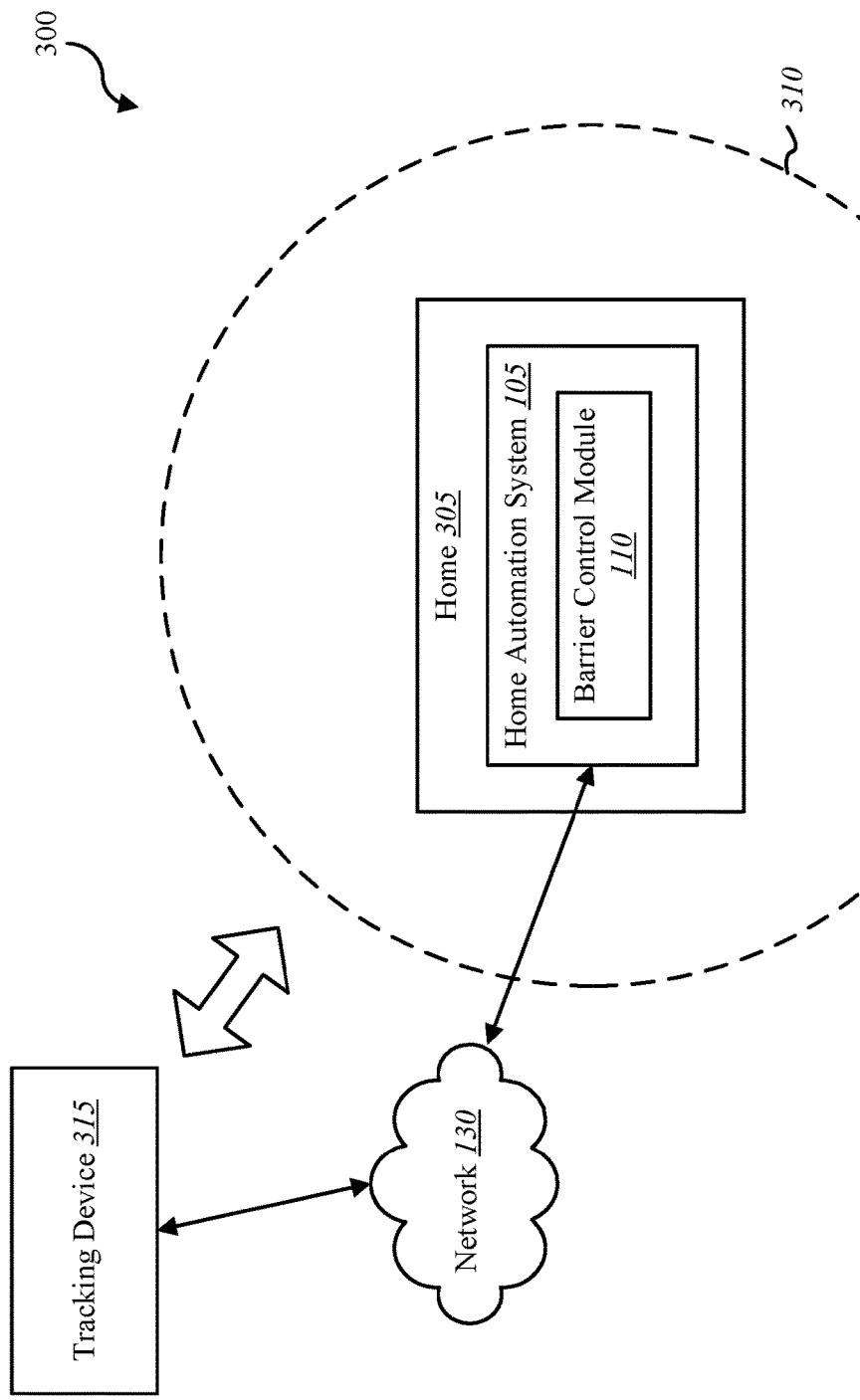
FIG. 3 is a block diagram of another environment in which the present systems and methods may be implemented.

FIG. 3 illustrates another environment 300 that may include at least some of the components of environments 100, 200 described above and may further include a tracking device 315. Home automation system 105 is shown associated with a home 305. Tracking device 315 may be used to track the location of a person, animal, vehicle, or the like relative to a boundary 310 (e.g., geo fence) and home 305. Tracking device 315 may communicate with home automation system 105 via, for example, network 130. Tracking device 315 may at times be positioned within home 305, at other times within boundary 310 and outside of home 305, and at other times outside of boundary 310.

Tracking device 315 may include a plurality of technologies and functionality that help determine not only a location of tracking device, but identification of the device and/or the person or object carrying tracking device 315, and an activity level of the person or object carrying tracking device 315. Further details concerning features and functionality of tracking device 315 are described below with reference to FIG. 5.

Although home 305 is identified as a building structure being monitored by home automation system 105, home 305 may represent other buildings, properties, or objects being monitored by home automation system 105. Home automation system 105 may include barrier control module 110 as described above with reference to FIGS. 1 and 2. Barrier control module 110 may operate to control operation and/or access through a barrier of home 305. Home 305 may include any of the other features and functionality of environments 100, 200 described above with reference to FIGS. 1 and 2, including, for example, the barrier 115 including the locking device 120, the sensors 125-a-1 and 125-a-2, the identification device 205, and various other features of home automation system 105.

Tracking device 315 may include capability to determine a relative location between tracking device 315 and home 305. In one example, tracking device 315 includes a GPS or similar technology that provides such location determination. Tracking device 315 may include identification technology such as, for example, near-field communication (e.g., Bluetooth) that helps communicate identification information to home automation system 105 and/or barrier control module 110. The identification information may include, for example, information needed to authenticate one or more users and/or authorize certain actions by the person or object carrying tracking device 315. In one example, tracking device 315 includes the same or similar functionality of identification device 205 described above.

Tracking device 315 may also include an accelerometer or other device that helps determine activity of the person or object carrying tracking device 315. For example, tracking device 315 may provide information about movement of the person or object within a given time period. In one scenario, the movement data helps determine whether a person has fallen asleep, has a health problem, is running, etc. This movement information may be helpful in determining, for example, whether to immediately send assistance to the person carrying tracking device 315.

Tracking device 315 may be structured in a variety of forms. For example, tracking device 315 may be in the form of a fob, a cell phone, or other electronic device. Tracking device 315 may be integrated into an existing device that helps conceal tracking device 315. For example, tracking device 315 may be integrated into a piece of clothing (e.g., a seam of a pair of pants, brim of a hat, or a shoe sole), an accessory (e.g., a bracelet, anklet, or necklace), back pack, water bottle, or other portable electronic device (e.g., a tablet, computer, personal game station, or the like).

FIG. 4 is a block diagram 400 illustrating one example of a barrier control module 110-a. Barrier control module 110-a may be one example of barrier control module 110 depicted in FIGS. 1, 2 and/or 3. As depicted, barrier control module 110-a may include a location module 405, an identification module 410, a locking module 415, and an alarm module 420. Barrier control module 110-a may include more or fewer modules and capabilities in other embodiments.

Location module 405 may operate to determine a location of one or more users, occupants, and/or visitors to a property such as a home or commercial place of business. Location module 405 may utilize information provided from a number of sensors, devices or systems to determine the location of a person or object. For example, location module 405 may receive sensor signals from sensors 125-a-1 and 125-a-2 shown in FIGS. 1 and 2. In one example, the information received by location module 405 may relate to operation of locking device 120 of barrier 115 (see FIGS. 1 and 2). The information about locking device 120 and/or barrier 115 may help determine whether the person is positioned on an interior or exterior of barrier 115. Other information may include information from a tracking device such as tracking device 315 described with reference to FIG. 3. The person or object may be determined to reside not only outside of the home, but also outside of a barrier (e.g., boundary 310 such as a geo fence). Location module 405 may also receive information related to a person's direction of travel relative to a barrier of a home (e.g., moving into or out of a home through a barrier).

Identification module 410 may be used to identify one or more persons or objects. Identification module 410 may receive information from any of a plurality of sensors or other devices or systems that provide insight into a person's activities is and/or what the person is authorized to do relative to, for example, a barrier or other activity associated with a home automation system. In one example, identification module 410 receives information from identification device 205, which is carried by a person and may provide information specific to that person. The information received by identification module 410 may identify that person as an authorized user, such as a person who is authorized to access a barrier 115 to move into or out of a home.

Locking module 415 may determine whether and/or when to actuate a locking device of a barrier for a monitored home. For example, locking module 415 may provide control of locking device 120 shown in FIGS. 1 and 2. Locking module 415 may have two-way communication with locking device 120 to not only send instructions concerning locking or unlocking, but also receive confirmation concerning the current state or action carried out by locking device 120.

Barrier control module 110-a may include other features and functionality to permit communication with other features of home automation system 105. For example, barrier control module 110-a may determine that a person is attempting to operate a barrier of a home from outside the home based on functionality or location of module 405. Barrier control module 110-a may determine that the person is an unauthorized user using identification module 410. Barrier control module 110-a may confirm that a locking device remains locked by functionality of locking module 415. Barrier control module 110-a may send a signal to home automation system 105 to generate an alarm that an unauthorized person is attempting to gain access to the property.

In at least some arrangements, barrier control module 110-a may also include an alarm module 420 that generates an alarm when unauthorized access of barrier occurs.

Figure 5:
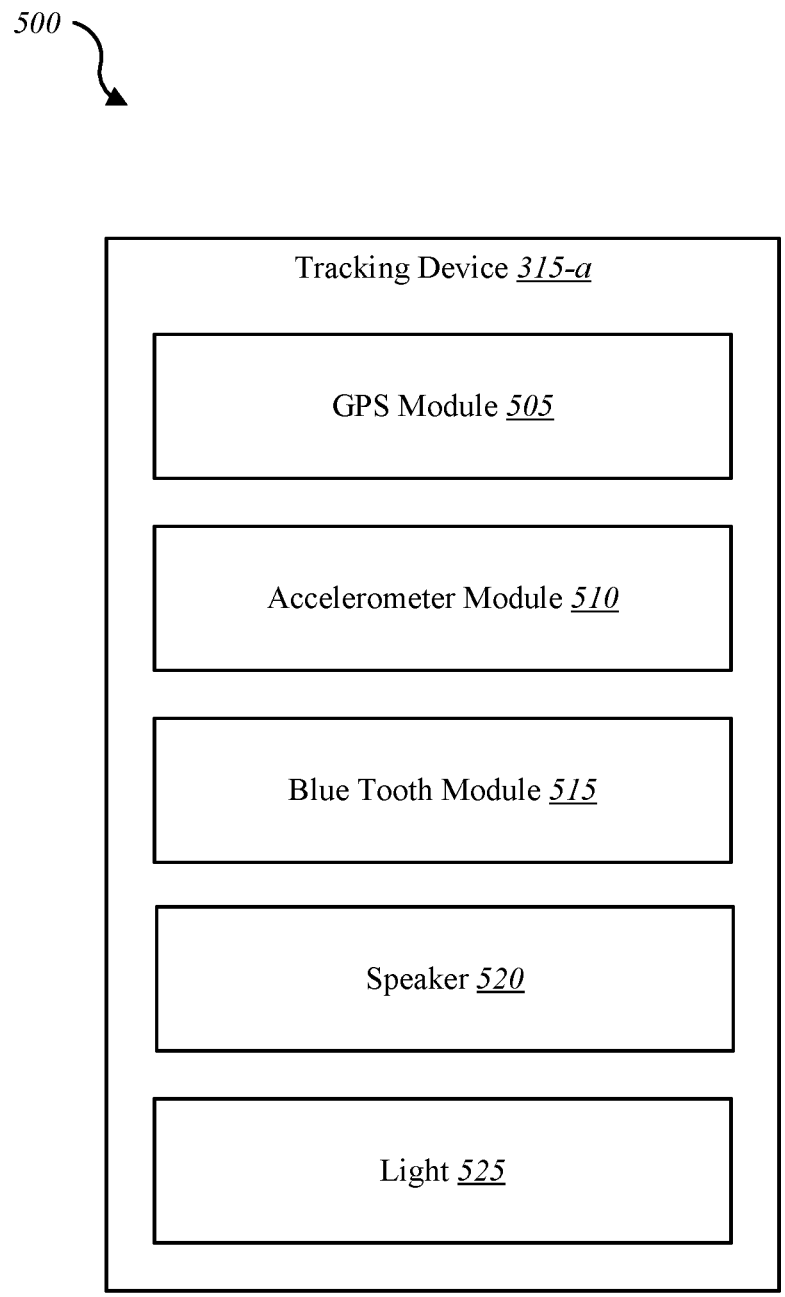
FIG. 5 is a block diagram of an example tracking device of the environment shown in FIG. 3.

FIG. 5 is a block diagram 500 illustrating an example tracking device 315-a. Tracking device 315-a may be one example of tracking device 315 depicted in FIG. 3. Tracking device 315-a, as depicted, may include a GPS module 505, an accelerometer module 510, a Bluetooth module 515, a speaker 520, and a light 525. Tracking device 315-a may include more or fewer modules and capabilities in other embodiments.

GPS module 505 may operate to provide mapping or positioning of tracking device 315-a relative to a reference point such as a property (e.g., home) being monitored by a home automation system 105 as described with reference to FIGS. 1-3. GPS module 505 may operate using various positioning technologies including global positioning systems (GPS), although other types of positioning and/or tracking technologies may be possible.

Accelerometer module 510 may comprise an accelerometer that monitors movement of tracking device 315-a. Accelerometer module 510-a may also infer a particular type of activity being carried out based on the movement data. For example, accelerometer module 510 may determine that a person or object carrying tracking device 315-a is running, walking, sitting/lying, traveling by vehicle, or the like. Accelerometer module 510 may be operable to generate notices or other signals based on a change in activity level or maintaining a certain activity level for a predetermine time period.

Bluetooth module 515 may be provide identification information related to tracking device 315-a and/or the person or object carrying tracking device 315-a. Bluetooth module 515 may implement Bluetooth technology or other near-field communication technology. Other types of technology may be used to convey identification information such as RFID technology.

Speaker 520 may provide at least one-way communication between tracking device 315-a and the person or object carrying tracking device 315-a. In one example, speaker 520 generates a beep, chime, audible voice message, music, ringtone, etc., wherein any of the generated sounds conveys a message. For example, speaker 520 may generate a voice message of "Jimmy, come home for dinner" at a certain time of day when GPS module 505 confirms that tracking device 315-a carried by Jimmy is away from home or outside of a geo boundary relative to the home. In another example, speaker 520 may generate an audible tone when accelerometer module 510 identifies no activity by the person carrying tracking device 315-a for a predetermine time period, which may indicate that the person has fallen asleep and needs to be roused. In a further example, speaker 520 may generate an audible series of numbers that represents a code for accessing a barrier of a home after Bluetooth module 515 communicates with a home automation system to confirm that the person carrying tracking device 315-a is an authorized user and the code permits access by the user.

Tracking device 315-a may include other communication features such as, for example, one or more light-generating devices such as a light 525. Light 525 may provide a visual indication to the person or object carrying tracking device 315-a. Light 525 may generate a light pattern, light color, or the like that communicates information to the person carrying tracking device 315-a. For example, a flashing red light may indicate that the person has moved outside of a geographical boundary relative to the home. A solid light may indicate a low battery for tracking device 315-*a*. A combination of lights displayed in series may communicate other information such as an indication that the person needs to take a dose of medicine.

Tracking device 315-*a* may include other features and functionality that assist in providing information about the person or object carrying tracking device 315-*a* or communicating directly with the person. In at least some examples, tracking device 315 includes a two-way communication system.

Figure 6:
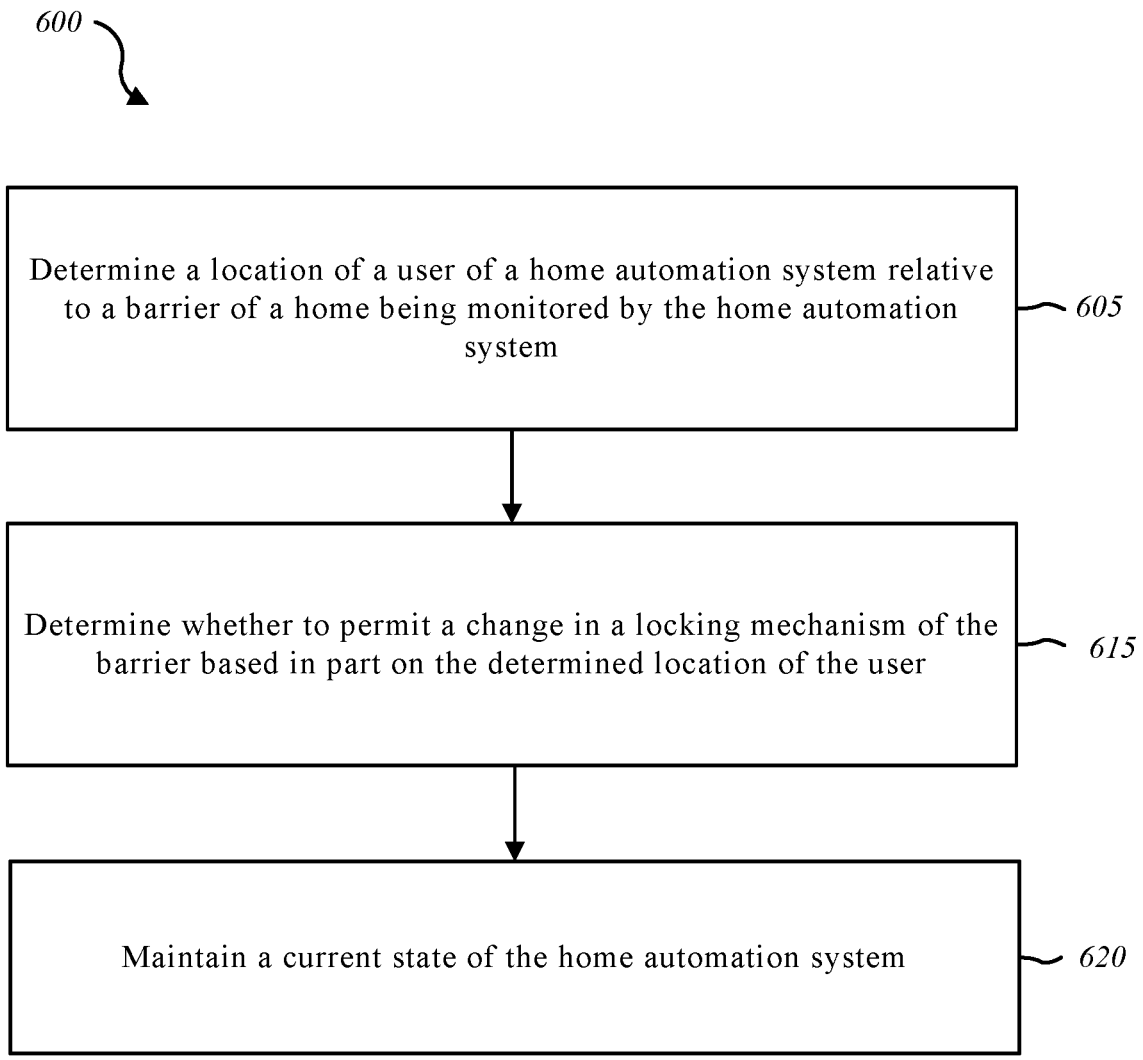
FIG. 6 is a flow diagram illustrating a method for controlling access to a home based on user occupancy.

FIG. 6 is a flow diagram illustrating one example of a method 600 for controlling access to a home based on user occupancy. In some confirmations, the method 600 may be implemented by the barrier control module 110 of home automation system 105 shown in FIGS. 1, 2 and/or 3. In other examples, method 600 may be performed generally by home automation system 105 shown in FIGS. 1, 2, and/or 3, or even more generally by the environments 100, 200, 300 shown in FIGS. 1-3, respectively. In some embodiments, method 600 may be implemented in conjunction with barrier 115 and/or locking device 120 shown in FIGS. 1 and/or 2.

At block 605, method 600 includes determining a location of a user of a home automation system relative to a barrier of a home being monitored by the home automation system. Block 615 includes determining whether to permit a change in a locking mechanism of the barrier based in part on a determine location of a user. Block 620 of method 600 includes maintaining a current state of the home automation system. The current state of the home automation system may be an on or active state such as an armed state of the security system.

Other steps of method 600 may include determining an identify of the user, wherein determining whether to permit the change in the locking mechanism of the barrier is based in part on the identity of the user. Determining a location of a user may include determining whether the user is inside or outside of the home. Determining a location of the user may include determining on which side of a barrier the user is positioned. The barrier may be a door or a window of the home, and the change in the locking mechanism may include locking or unlocking the locking mechanism to control opening of the door or window. Determining the location of the user may include determining whether the user is touching an inside handle used to control opening the barrier, or an outside handle used to control opening of the barrier. Determining whether to permit a change in a locking mechanism of the barrier may include unlocking the locking mechanism if the user is inside the house. Determining whether to permit a change in the locking mechanism of the barrier may include unlocking the locking mechanism if the user is located inside or outside the home and is identified as an authorized person, and maintaining the door locked if the user is located inside or outside the home and is identified as an unauthorized person. The method 600 may include generating an alarm when the user is identified as an unauthorized person and attempts to open the barrier from outside the home. Determining a location of a user may include receiving signals from at least one of a touch sensor, a voice recognition sensor, a motion sensor, and an optical sensor.

Figure 7:
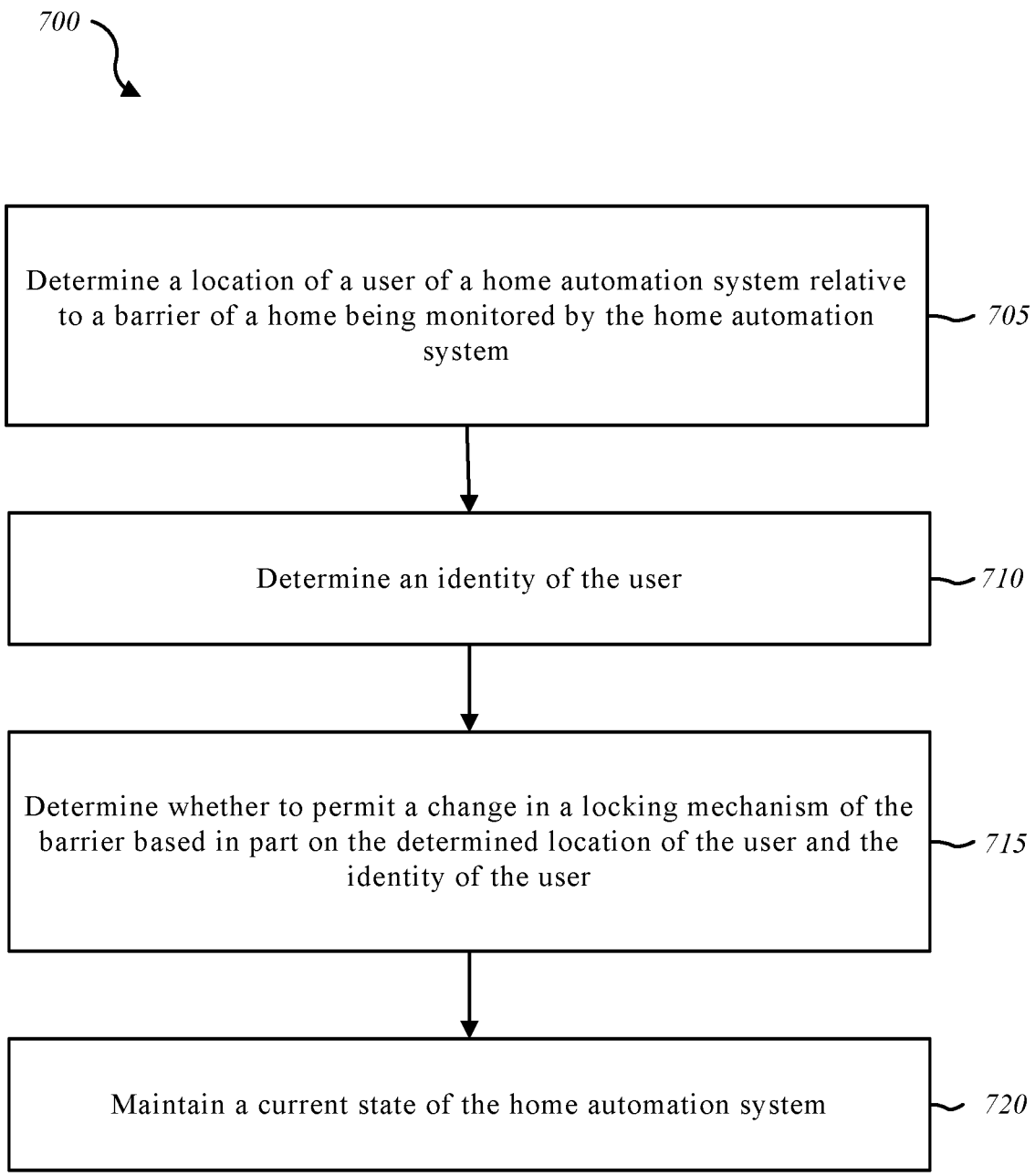
FIG. 7 is a flow diagram illustrating another method for controlling access to a home based on user occupancy.

FIG. 7 is a flow diagram illustrating one embodiment of a method 700 for controlling access to a home based on user occupancy. In some configurations, the method 600 may be implemented by the barrier control module 110 of home automation system 105 shown in FIGS. 1, 2 and/or 3. In some examples, method 700 may be performed generally by home automation system 105 shown in FIGS. 1, 2 and/or 3, or even more generally by environments 100, 200 or 300 shown in FIGS. 1-3, respectively. In some configurations, method 700 may be implemented in conjunction with locking device 120 and/or barrier 115 shown in FIGS. 1, 2 and/or 3.

At block 705, method 700 includes determining a location of a user of a home automation system relative to a barrier of a home being monitored by the home automation system. Block 710 includes determining an identity of the user. Block 715 includes determining whether to permit a change in a locking mechanism of the barrier based in part on the determined location of a user and the identity of the user. Block 720 includes maintaining a current state of the home automation system.

The current state of the home automation system may include an "on" or active state such as an armed state of the security system. The determining step shown in block 715 may also include unlocking the locking mechanism if the user is located inside or outside the home and has been identified as an authorized person, and maintaining the door lock if the user is located outside the home and is identified as an unauthorized person. Determining a location of the user may include determining if the user is touching an inside handle or an outside handle used to open the barrier. Determining the identity of the user may include receiving a signal from an electronic device carried by the user.

Figure 8:
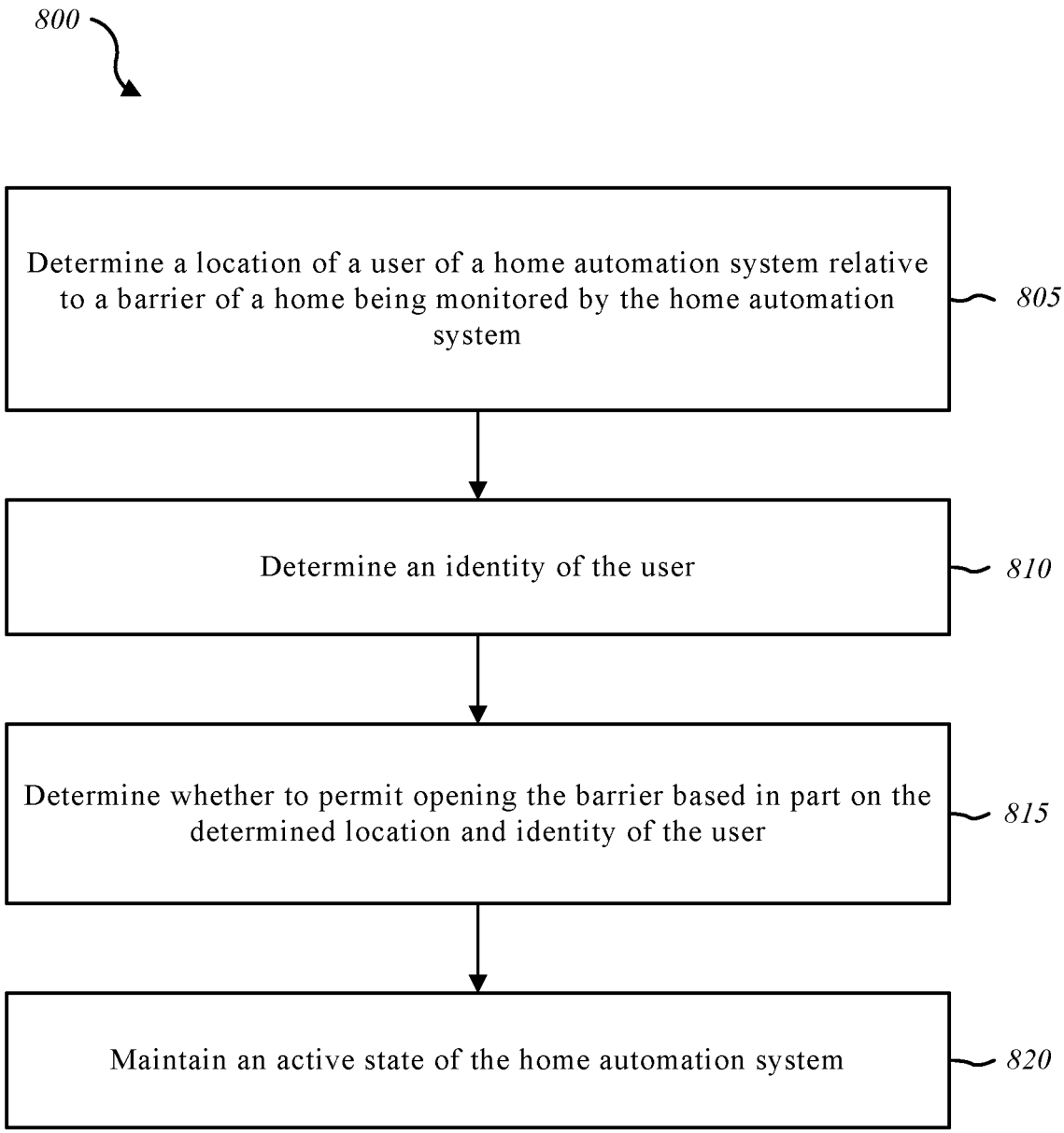
FIG. 8 is a flow diagram illustrating another method for controlling access to a home based on user occupancy.

FIG. 8 is a flow diagram illustrating one example of a method 800 for controlling access to a home based on user occupancy. In some configurations, the method 800 may be implemented by the barrier control module 110 of home automation system 105, shown in FIGS. 1, 2 and/or 3. In other examples, method 800 may be performed generally by home automation system 105 shown in FIGS. 1, 2 and/or 3, or even more generally by the environments 100, 200 or 300 shown in FIGS. 1-3, respectively. In some configurations, method 800 may be implemented in conjunction with locking device 120 and/or barrier 115 shown in FIGS. 1 and/or 2.

At block 805, the method 800 includes determining a location of a user of a home automation system relative to a barrier of a home being monitored by the home automation system. Block 810 includes determining an identity of the user. Block 815 includes determining whether to permit opening the barrier based in part on the determined location and identity of a user. Block 820 includes maintaining an active state of the home automation system. The active state may be maintained for all steps of method 800.

Method 800 may also include unlocking a locking mechanism of the barrier when a user is identified as an authorized user, and locking the locking mechanism when the user is identified as an unauthorized user. The method 800 may include unlocking a locking mechanism of the barrier when a user is determine to be located on one side of the barrier, and locking the locking mechanism when the user is determined to be located on an opposite side of the barrier. Determining a location of the user may include determining use of a handle assembly used to open the barrier.

Figure 9:
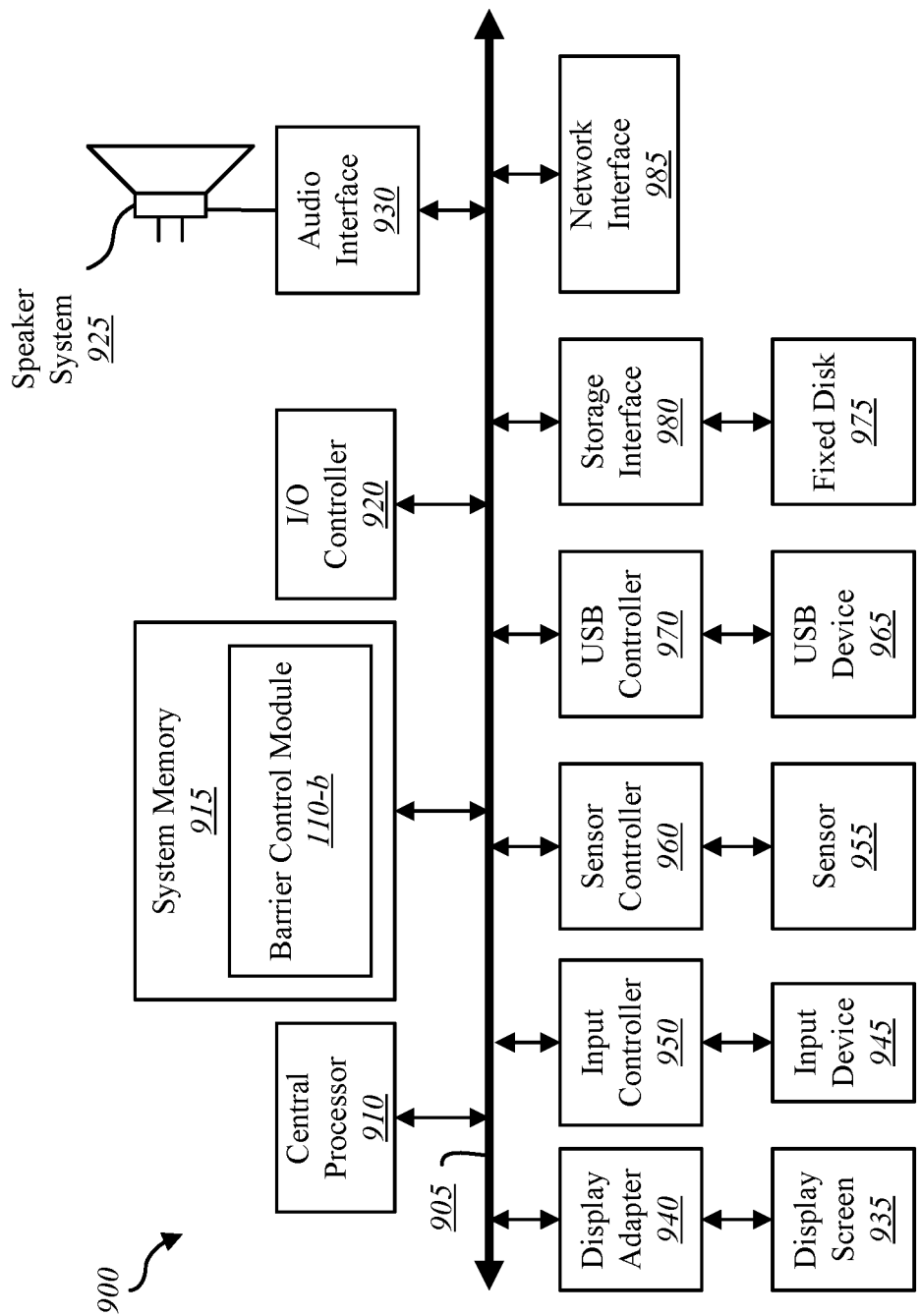
FIG. 9 is a block diagram of a computer system suitable for implementing the present systems and methods of FIGS. 1-8.

FIG. 9 depicts a block diagram of a controller 900 suitable for implementing the present systems and methods. The controller 900 may be an example of the automation controller 220 and/or the mobile computing device 230 illustrated in FIG. 3. In one configuration, controller 900 includes a bus 905 which interconnects major subsystems of controller 900, such as a central processor 910, a system memory 915 (typically RAM, but which may also include ROM, flash RAM, or the like), an input/output controller 920, an external audio device, such as a speaker system 925 via an audio output interface 930, an external device, such as a display screen 935 via display adapter 940, an input device 945 (e.g., remote control device interfaced with an input controller 950), multiple USB devices 965 (interfaced with a USB controller 970), and a storage interface 980. Also included are at least one sensor 955 connected to bus 905 through a sensor controller 960 and a network interface 985 (coupled directly to bus 905).

Bus 905 allows data communication between central processor 910 and system memory 915, which may include read-only memory (ROM) or flash memory (neither shown), and random access memory (RAM) (not shown), as previously noted. The RAM is generally the main memory into which the operating system and application programs are loaded. The ROM or flash memory can contain, among other code, the Basic Input-Output system (BIOS) which controls basic hardware operation such as the interaction with peripheral components or devices. For example, an barrier control module 110-$b$ to implement the present systems and methods may be stored within the system memory 915. The barrier control module 110-$b$ may be an example of the barrier control module 110 illustrated in FIGS. 1, 2 and/or 3. Applications (e.g., application 330) resident with controller 900 are generally stored on and accessed via a non-transitory computer readable medium, such as a hard disk drive (e.g., fixed disk 975) or other storage medium. Additionally, applications can be in the form of electronic signals modulated in accordance with the application and data communication technology when accessed via interface 985.

Storage interface 980, as with the other storage interfaces of controller 900, can connect to a standard computer readable medium for storage and/or retrieval of information, such as a fixed disk drive 975. Fixed disk drive 975 may be a part of controller 900 or may be separate and accessed through other interface systems. Network interface 985 may provide a direct connection to a remote server via a direct network link to the Internet via a POP (point of presence). Network interface 985 may provide such connection using wireless techniques, including digital cellular telephone connection, Cellular Digital Packet Data (CDPD) connection, digital satellite data connection, or the like. In some embodiments, one or more sensors (e.g., motion sensor, smoke sensor, glass break sensor, door sensor, window sensor, carbon monoxide sensor, and the like) connect to controller 900 wirelessly via network interface 985.

Many other devices or subsystems (not shown) may be connected in a similar manner (e.g., entertainment system, computing device, remote cameras, wireless key fob, wall mounted user interface device, cell radio module, battery, alarm siren, door lock, lighting system, thermostat, home appliance monitor, utility equipment monitor, and so on). Conversely, all of the devices shown in FIG. 9 need not be present to practice the present systems and methods. The devices and subsystems can be interconnected in different ways from that shown in FIG. 9. The aspect of some operations of a system such as that shown in FIG. 9 are readily known in the art and are not discussed in detail in this application. Code to implement the present disclosure can be stored in a non-transitory computer-readable medium such as one or more of system memory 915 or fixed disk 975. The operating system provided on controller 900 may be iOS®, ANDROID®, MS-DOS®, MS-WINDOWS®, OS/2®, UNIX®, LINUX®, or another known operating system.

Moreover, regarding the signals described herein, those skilled in the art will recognize that a signal can be directly transmitted from a first block to a second block, or a signal can be modified (e.g., amplified, attenuated, delayed, latched, buffered, inverted, filtered, or otherwise modified) between the blocks. Although the signals of the above described embodiment are characterized as transmitted from one block to the next, other embodiments of the present systems and methods may include modified signals in place of such directly transmitted signals as long as the informational and/or functional aspect of the signal is transmitted between blocks. To some extent, a signal input at a second block can be conceptualized as a second signal derived from a first signal output from a first block due to physical limitations of the circuitry involved (e.g., there will inevitably be some attenuation and delay). Therefore, as used herein, a second signal derived from a first signal includes the first signal or any modifications to the first signal, whether due to circuit limitations or due to passage through other circuit elements which do not change the informational and/or final functional aspect of the first signal.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered exemplary in nature since many other architectures can be implemented to achieve the same functionality.

The process parameters and sequence of steps described and/or illustrated herein are given by way of example only and can be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

Furthermore, while various embodiments have been described and/or illustrated herein in the context of fully functional computing systems, one or more of these exemplary embodiments may be distributed as a program product in a variety of forms, regardless of the particular type of computer-readable media used to actually carry out the distribution. The embodiments disclosed herein may also be implemented using software modules that perform certain tasks. These software modules may include script, batch, or other executable files that may be stored on a computer-readable storage medium or in a computing system. In some embodiments, these software modules may configure a computing system to perform one or more of the exemplary embodiments disclosed herein.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the present systems and methods and their practical applications, to thereby enable others skilled in the art to best utilize the present systems and methods and various embodiments with various modifications as may be suited to the particular use contemplated.

Unless otherwise noted, the terms "a" or "an," as used in the specification and claims, are to be construed as meaning "at least one of." In addition, for ease of use, the words "including" and "having," as used in the specification and claims, are interchangeable with and have the same meaning as the word "comprising." In addition, the term "based on" as used in the specification and the claims is to be construed as meaning "based at least upon".

What is claimed is:

1. An apparatus for controlling access to a home based on user occupancy, comprising:
   a processor;
   a memory in electronic communication with the processor; and
   instructions stored in the memory, the instructions being executable by the processor to:
      detect, via at least one sensor, interaction with a locking mechanism by a user, wherein the locking mechanism comprises the at least one sensor and is configured to be actuated via at least one of an inner side of a barrier of a home and an outer side of barrier, wherein the home is monitored by a home automation system communicatively coupled to the locking mechanism, and wherein the home automation system is in an armed state such that one or more alarms is triggered in response to unauthorized access through the barrier;
      determine, by a controller of the home automation system, that the user is authorized access through the barrier in response to the user interacting with the locking mechanism via the inner side of the barrier; and
      in response to determining that the user is authorized, actuate the locking mechanism to unlock the barrier and provide the user access therethrough, wherein actuating the locking mechanism maintains the armed state and suppresses the one or more alarms.

2. The apparatus of claim 1, wherein the instructions are executable by the processor to:
   determine an identity of the user, wherein determining whether the user is authorized is based in part on the identity of the user.

3. The apparatus of claim 2, wherein determining the identity of the user is based at least in part on one or more identifiers associated with the user.

4. The apparatus of claim 2, wherein actuating the locking mechanism includes:
   unlocking the locking mechanism in response to the locking mechanism being interacted with via the inner side of the barrier; and
   maintaining the barrier locked in response to the locking mechanism being interacted with via the outer side of the barrier and is identified as an unauthorized person.

5. The apparatus of claim 2, wherein the instructions are executable by the processor to:
   generate an alarm when the user is identified as an unauthorized person and the locking mechanism is interacted with via the outer side of the barrier.

6. The apparatus of claim 1, wherein the barrier is one of a door and a window of the home.

7. The apparatus of claim 1, wherein determining whether the user is authorized includes determining one or more intent factors of the user.

8. The apparatus of claim 7, wherein determining the one or more intent factors of the user comprises determining whether the user is touching an inside handle used to control opening the barrier or an outside handle used to control opening of the barrier.

9. The apparatus of claim 1, wherein the at least one sensor comprises at least one of a touch sensor, a voice recognition sensor, the motion sensor, and an optical sensor.

10. A computer-program product comprising a non-transitory computer-readable medium storing instructions executable by a processor to:
    detect, via at least one sensor, interaction with a locking mechanism by a user, wherein the locking mechanism comprises the at least one sensor and is configured to be actuated via at least one of an inner side of a barrier of a home and an outer side of the barrier, wherein the home is monitored by a home automation system communicatively coupled to the locking mechanism, and wherein the home automation system is in an armed state such that one or more alarms is triggered in response to unauthorized access through the barrier;
    determine, by a controller of the home automation system, that the user is authorized access through the barrier in response to the user interacting with the locking mechanism via the inner side of the barrier; and
    in response to determining that the user is authorized, actuate the locking mechanism to unlock the barrier and provide the user access therethrough, wherein actuating the locking mechanism maintains the armed state and suppresses the one or more alarms.

11. The computer-program product of claim 10, wherein actuating the locking mechanism includes:
    unlocking the locking mechanism in response to the locking mechanism being interacted with via the inner side of the barrier; and
    maintaining the barrier locked in response to the locking mechanism being interacted with via the outer side of the barrier and is identified as an unauthorized person.

12. The computer-program product of claim 10, wherein determining the position of the user includes determining if the user is touching an inside handle or an outside handle used to open the barrier.

13. The computer-program product of claim 10, wherein the instructions are executable by the processor to determine an identity of the user by receiving a signal from an electronic device carried by the user.

14. The computer-program product of claim 10, wherein feedback from the at least one sensor, is receivable by the controller irrespective of whether the state of the home automation system is in the armed state or a disarmed state.

15. A computer-implemented method comprising:
    detecting, via at least one sensor, interaction with a locking mechanism by a user, wherein the locking mechanism comprises the at least one sensor and is configured to be actuated via at least one of an inner side of a barrier of a home and an outer side of the barrier, wherein the home is monitored by a home automation system communicatively coupled to the locking mechanism, and wherein the home automation system is in an armed state such that one or more alarms is triggered in response to unauthorized access through the barrier;
    determining, by a controller of the home automation system, that the user is authorized access through the barrier in response to the user interacting with the locking mechanism via the inner side of the barrier; and
    in response to determining that the user is authorized, actuating the locking mechanism to unlock the barrier and provide the user access there through, wherein actuating the locking mechanism maintains the armed state and suppresses the one or more alarms.

16. The method of claim 15, further comprising:
unlocking the locking mechanism in response to the locking mechanism being interacted with via the inner side of the barrier and the user is identified as an authorized user; and
locking the locking mechanism in response to the locking mechanism being interacted with via the outer side of the barrier and the user is identified as an unauthorized user.

17. The method of claim 15, further comprising:
unlocking the locking mechanism in response to the locking mechanism being interacted with via the inner side of the barrier; and locking the locking mechanism in response to the locking mechanism being interacted with via the outer side of the barrier.

18. The method of claim 15, wherein determining whether the user is authorized access includes determining use of a handle assembly used to open the barrier.

\* \* \* \* \*